United States Patent
De Andres Zurbano et al.

(10) Patent No.: US 11,839,524 B2
(45) Date of Patent: Dec. 12, 2023

(54) DENTAL INTERPHASE WITH A MODE FOR THE REVERSIBLE FITTING OF A PROSTHETIC STRUCTURE TO AN IMPLANT

(71) Applicant: GT-MEDICAL, S.L., Madrid (ES)

(72) Inventors: Tomas De Andres Zurbano, Madrid (ES); Ramon Mandado Diez, Madrid (ES)

(*) Notice: Subject to any disclaimer, the term of this patent is extended or adjusted under 35 U.S.C. 154(b) by 153 days.

(21) Appl. No.: 17/606,688

(22) PCT Filed: Feb. 26, 2020

(86) PCT No.: PCT/ES2020/070136
§ 371 (c)(1),
(2) Date: Oct. 26, 2021

(87) PCT Pub. No.: WO2020/174113
PCT Pub. Date: Sep. 3, 2020

(65) Prior Publication Data
US 2022/0211471 A1   Jul. 7, 2022

(30) Foreign Application Priority Data
Feb. 26, 2019   (ES) ................ ES201930172

(51) Int. Cl.
*A61C 8/00* (2006.01)
*A61C 13/00* (2006.01)
(52) U.S. Cl.
CPC .......... *A61C 8/0066* (2013.01); *A61C 8/0065* (2013.01); *A61C 8/0068* (2013.01); *A61C 13/0004* (2013.01)

(58) Field of Classification Search
CPC ... A61C 8/0066; A61C 8/0065; A61C 8/0068; A61C 8/0004; A61C 8/006; A61C 8/005;
(Continued)

(56) References Cited

U.S. PATENT DOCUMENTS 5,527,182 A   6/1996  Willoughby
5,782,918 A * 7/1998  Klardie ................ A61C 8/0069
                                                   433/172
(Continued)

FOREIGN PATENT DOCUMENTS

ES   2354102 A1   3/2011
ES   2386042 A1   8/2012
(Continued)

*Primary Examiner* — Ralph A Lewis
*Assistant Examiner* — Mirayda A Aponte
(74) *Attorney, Agent, or Firm* — Eugenio J. Torres-Oyola; Victor M. Rodriguez Reyes; Rafael Rodriguez Muriel

(57) ABSTRACT

A dental interphase with a mode for the reversible fitting of a prosthetic structure to a dental implant that includes an expander core (2), an activator screw (3) and a connection element (26), wherein the activator screw (3) incorporates an external thread (31) for being attached to the expander core (2) by screwing onto an internal thread (22) in the area of notches (23) to a specific depth, the connection element being intended for being coupled to the expander core (2) by attaching a coupling area (14) incorporated in a complementary coupling area (24) incorporated in the expander core (2) such that, once the activator screw (3) is inserted into the expander core (2) the attachment of the interphase to the implant (6) may be permanent, or it may be reversible, where it can be taken apart.

6 Claims, 5 Drawing Sheets

(58) Field of Classification Search
CPC ..... A61C 8/0028; A61C 8/0089; A61C 1/084;
A61C 1/082; A61C 3/02; B23C 5/18;
B25H 1/0064
USPC ...................................... 433/173–176, 201.1
See application file for complete search history.

(56) References Cited

U.S. PATENT DOCUMENTS

| | | | |
|---|---|---|---|
| 10,350,033 | B2 | 7/2019 | Bugnard et al. |
| 2014/0162211 | A1 | 6/2014 | Mullaly et al. |
| 2016/0354183 | A1* | 12/2016 | Montero .............. A61C 8/0074 |

FOREIGN PATENT DOCUMENTS

| | | |
|---|---|---|
| ES | 1182233 | 5/2017 |
| ES | 1184883 | 6/2017 |
| ES | 2672934 | 6/2018 |

* cited by examiner

DENTAL INTERPHASE WITH A MODE FOR THE REVERSIBLE FITTING OF A PROSTHETIC STRUCTURE TO AN IMPLANT

OBJECT OF THE INVENTION

The present invention relates to an interphase for the attachment of a prosthetic structure to a dental implant. The prosthetic structure can be unitary or multiple, consisting in the latter case of several dental prostheses and the prosthetic structure being fixed on a plurality of implants. The interphase consists of two or three parts depending on whether the prosthetic structure is manufactured by CAD/CAM or by hand, respectively. It has the particularity that it allows the attachment to be temporary or definitive by simply adjusting the clamping level of one of the components.

The invention has a particular application in the industrial field of the dentistry-implantology sector, specifically focusing on the field of dental implants, distinguishing prosthetic structures manufactured by manual means and attached to the dental implant by cementing, from prosthetic structures manufactured with CAD/CAM systems, which are screwed directly onto dental implants by copying the surface on which they are to be fixed.

Technical Problem to be Solved and Background of the Invention

In the current state of the art there are different systems and solutions for achieving a functional dental prosthesis. One of them is the use of biocompatible metal elements located between the implant and the dental prosthesis, known in the dentistry-implantology sector as interphases, and serving as connection elements between a dental prosthesis structure and the screw which allows fixing said prosthesis on an implant.

Interphases are parts that are generally manufactured from titanium and are screwed on the implant, which is the non-visible portion that is inserted into the mandibular or maxillary bone. The prosthetic structure or dental prosthesis, the visible outer portion imitating the tooth, is cemented on the interphases with a specific dual cement which causes permanent attachment. Another alternative is for said interphases to be welded to the prosthetic structure, which depends on the design of the prosthesis and on the materials used.

The use of the interphase is intended for obtaining a passive fitting of the prosthetic structure on implants, since the prosthetic structure is cemented or welded to the interphase at the end of the process of manufacturing the prosthesis, obtaining a structure without stressing.

Interphases also protect the mechanical functionality of the screwing and the connection of the prosthetic structure on the implants, since the screw fastener is seated and clamped on titanium, which is the material normally used to manufacture implants, while the prosthetic structures, which are usually manufactured from zirconium, being directly screwed onto the titanium implant, may deteriorate the connection of the implant since zirconium is a very hard and abrasive material, therefore the prosthetic structures are preferably cemented on titanium interphases for contact to be titanium-titanium.

Likewise, the prosthetic structures made from titanium and other metals are cemented or welded on interphases for the purpose of saving milling time when manufactured by CAD/CAM.

There are, therefore, two main ways to place a dental prosthesis on an implant. The first consists of screwing the prosthetic structure directly onto the implant, while the second way consists of screwing the prosthetic structure through elements serving as an interphase between the implant and the prosthetic structure.

There can be found in the state of the art interphases formed by a frustoconical body or straight body in one or more heights, and with retaining and positioning areas, as well as with a sandblasted outer body. In the internal portion, they have a straight or conical seating for the screw and a base with a connection depending on the type of implant, varying the configuration of said base according to the type of connection of the implant, depending on whether it is internal/external and/or engaging/non-engaging, to achieve correct final positioning.

Engaging and non-engaging systems of the base contemplate different positioning forms, generally with a flat area for referencing and assuring the position of the prosthetic structure on the implant.

However, the main drawback of the current art of manufacturing interphases, which is common to all of them, is that a cement or a weld must always be used for attaching the interphase to the prosthesis, which makes this attachment permanent, and said attachment is only reversible using destructive methods.

The following documents describe attachments of prosthetic structures to implants by interphases consisting of a single part and requiring cement to be attached to the prosthetic structure.

ES 1182233 U
ES 1 184 883 U
ES 2 431 392 T3

There are also other methods of attaching a prosthetic structure to an implant which are destructive but do not use cement, and are similar to what is disclosed in the present invention. These systems for connecting dental prostheses to implants are set forth in the following documents:

ES 2 386 042 B1
ES 2 354 102 B1
ES 2 672 934 T3
US 2014/0162211 A1
US 005527182 A

It should furthermore be indicated that, as a reference to the current state of the art, at least on the part of the applicant, there is no other known interphase presenting technical, structural and constitutive features similar to the interphase for dental prostheses described in the present specification.

DESCRIPTION OF THE INVENTION

In order to meet the objectives and avoid the aforementioned drawbacks, the present invention describes a dental interphase with a mode for the reversible fitting of a prosthetic structure to a dental implant. The dental interphase comprises an expander core, an activator screw and a connection element.

The expander core comprises a base, a complementary coupling area, an internal thread and a plurality of notches, wherein each of the notches incorporates a protuberance.

In turn, the activator screw comprises an external thread, a projecting head, a recess in the internal area of the projecting head and a hollowing out formed for introducing a tool.

The connection element has a hollowed out cylindrical configuration externally having a smooth area and internally comprising a coupling area at one end and a projection in a more internal area.

The functionality of the different components is indicated below.

The activator screw is intended for being attached to the expander core by screwing the external thread of the activator screw onto the internal thread of the expander core in the area of the notches to a specific depth determined by the type of attachment.

The connection element is intended for being coupled to the expander core by attaching the coupling area in the complementary coupling area until the protuberances of the notches go past the projection of the connection element.

Therefore, once the activator screw is inserted into the expander core two situations may arise.

The first consists of the attachment of the interphase to the implant being permanent if the projecting head of the activator screw contacts the notches.

The second is that the attachment of the interphase to the implant is reversible if the projecting head of the activator screw does not contact the notches, which can be elastically deformed when extracted to overcome the projection.

The connection element can be configured in two different ways.

On one hand, it can be located at one of the ends of an outer cylinder which, at the other end, is prolonged to externally incorporate a striated area intended for fixing a prosthetic structure created by hand. In this case, once the prosthetic structure is attached to the outer cylinder, after a curing time, they form a single solidly attached assembly.

On the other hand, the connection element can also be located in a prosthetic structure manufactured by CAD/CAM, such that the attachment of the prosthetic structure to the expander core is direct.

Furthermore, the interphase of the invention also relates to the attachment of multiple prosthetic structures, of the type comprising a plurality of individual dental prostheses, and intended for being fixed on a plurality of implants.

In the case of prosthetic structures created by hand, once the prosthetic structure is positioned on the implants, the dental interphase is separable such that channels can be made in the prosthetic structure intended for housing a fixing screw and thus being able to fix it to the implant in the correct position.

A guide cylinder is used for the positioning of the channels, which guide cylinder incorporates at one end a structure of notches identical to that of the expander core for the coupling in the outer cylinder which is already attached to the prosthetic structure, accurately defining the position of the implants.

The guide cylinder incorporates a cylindrical hollowing out for guiding a router bit intended for machining in the prosthetic structure the channels for housing the fixing screws for fixing the prosthetic structure to the implant.

BRIEF DESCRIPTION OF THE FIGURES

To complete the description of the invention and for the purpose of helping to better understand its features according to a preferred embodiment thereof, a set of drawings is attached in which the following figures are depicted in an illustrative and non-limiting manner.

Figure 1:
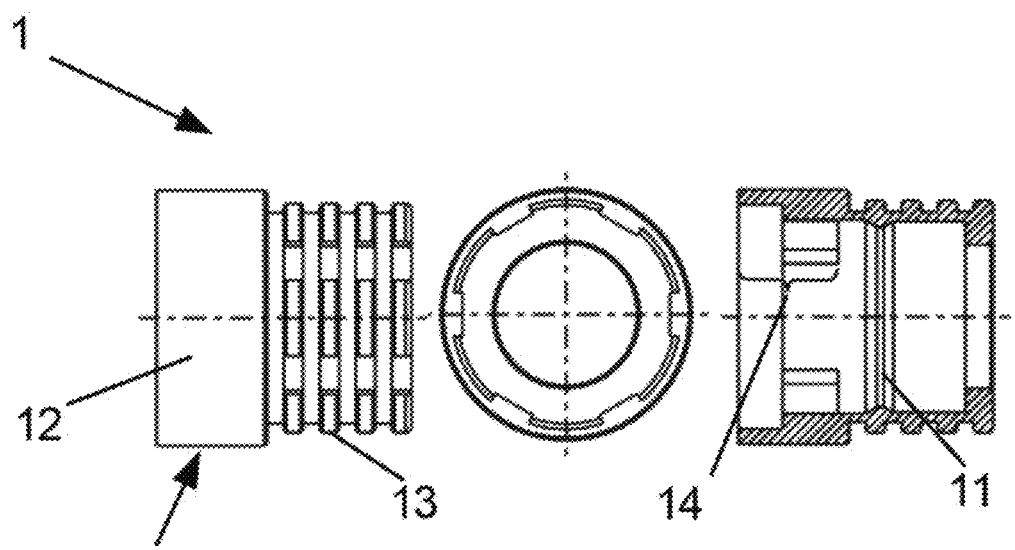
FIG. 1 depicts a side, front and cross-sectional view of the outer cylinder.

A list of the references used in the figures is provided below:
1. Outer cylinder
2. Expander core
3. Activator screw
4. Guide cylinder
5. Fixing screw for fixing to the implant
6. Dental implant
7. Router bit
11. Projection.
12. Smooth area.
13. Striated area.
14. Coupling area.
21. Base.
22. Internal thread.
23. Notches.
24. Complementary coupling area.
25. Protuberances.
31. External thread.
32. Recess.
33. Surface with a hexagonal cross section.
34. Projecting head.
41. Inner cylindrical surface.

DESCRIPTION OF A PREFERRED EMBODIMENT OF THE INVENTION

The present invention relates to an interphase with a mode for a reversible or definitive attachment of a prosthetic structure to a dental implant (6). The interphase is basically formed by two parts: an expander core (2) and an activator screw (3), which parts can be increased to three, including an outer cylinder (1), in the event that prosthetic structure is manufactured by hand instead of by CAD/CAM.

First each of the elements forming the interphase will be described and then their functionality will be described.

As depicted in FIG. 1, the outer cylinder (1) has a cylindrical configuration and consists of an internal surface and another external surface.

The internal surface comprises a coupling area (14) at one of the ends and a perimeter projection (11) in a more internal area.

The external surface comprises a smooth area (12), in correspondence with the coupling area (14), and a striated area (13).

Figure 2:
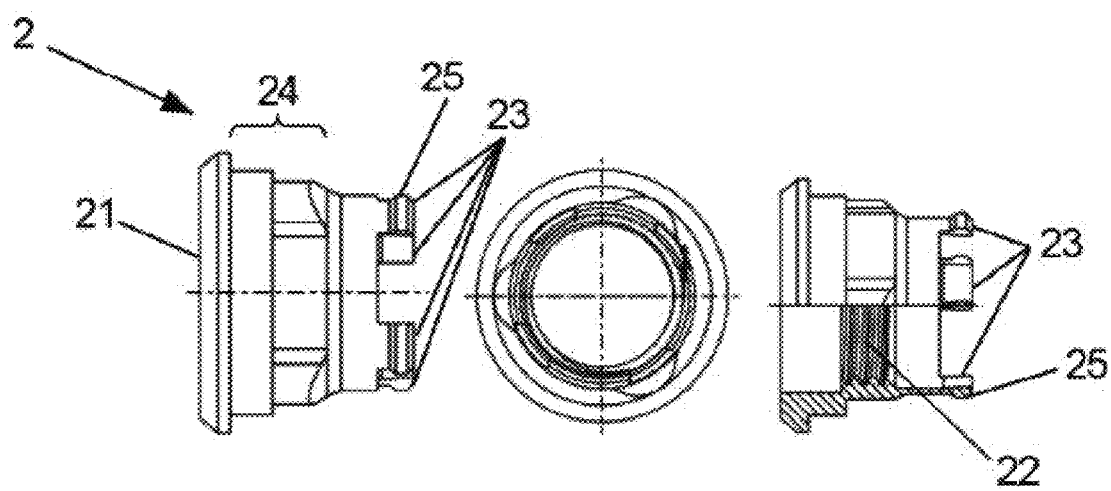
FIG. 2 depicts a side, front and cross-sectional view of the expander core.

FIG. 2 depicts the expander core (2). It is externally configured by means of a base (21), intended for being supported on the implant (6), a complementary coupling area (24), having a geometry complementary to the coupling area (14) of the outer cylinder (1), where it is intended for being coupled, and notches (23) which, at the free end, incorporate an outward protuberance (25). The expander core (2) internally has a cylindrical configuration incorporating an internal thread (22).

Figure 3:
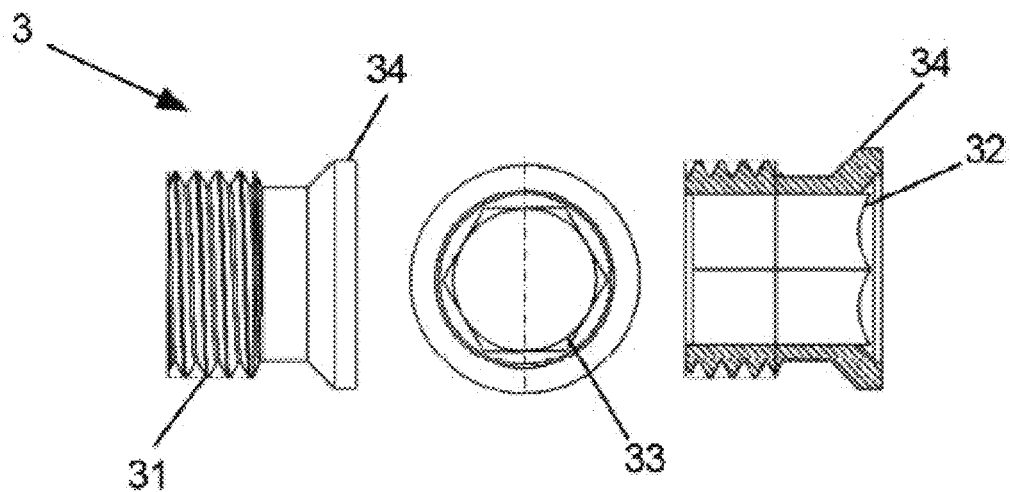
FIG. 3 depicts a side, front and cross-sectional view of the activator screw.

As depicted in FIG. 3, the activator screw (3) is configured by means of a hollow cylindrical structure which at one end incorporates an external thread (31) and at the other end incorporates a projecting head (34) with a recess (32) across the internal area. The activator screw (3) is internally configured by means of a surface with a hexagonal cross section (33) intended for receiving a tool.

Having described the components of the interphase, their functionalities will be described below.

The functionality of the outer cylinder (1) is to be coupled with the expander core (2) by means of the coupling areas (14, 24) and also through the projection (11), having the function of retaining the protuberances (25) of the notches (23) once they have gone past it, being elastically deformed, in an assembly situation, assuring a correct attachment of the expander core (2) to the outer cylinder (1).

As indicated, the outer cylinder (1) is a component of the interphase that is only used in the case of carrying out the attachment to the dental implant (6) with prosthetic structures that are manufactured by hand and not by CAD/CAM. This is because if they are manufactured by CAD/CAM, the inner surface of the prosthetic structure intended for being coupled on the interphase is provided with the same geometry as the coupling area (14) of the outer cylinder (1) or, what is the same, a geometry complementary to the complementary coupling area (24) of the expander core (2) where it is intended for being coupled, so in this case it is not necessary to use the outer cylinder (1).

Therefore, provided that the description refers to the assembly of the expander core (2) on the outer cylinder (1) the case of the coupling between the expander core (2) and a prosthetic structure manufactured by CAD/CAM should also be understood to be included.

The striated area (13) is intended for the attachment of prosthetic structures which are manufactured by hand and not by CAD/CAM.

In turn, the expander core (2) has a triple function.

First, the base (21) of the expander core (2) is very precisely fitted with the geometry of the dental implant (6), which can greatly vary, being able to adopt different shapes depending on the type of implant (6) to which it is connected or on if the prosthetic structure is unitary or multiple, comprising several unitary prostheses.

Secondly, the expander core (2) has the function of housing the activator screw (3), the external thread (31) of which is threaded on the internal thread (22) of the expander core (2).

Thirdly, the expander core (2) also has the function of producing mechanical retention with the outer cylinder (1).

In an assembly situation, when the expander core (2) is introduced in the outer cylinder (1), the notches (23) are elastically deformed so that the protuberances (25) can go past the projection (11), act as a stop so that they cannot go back, with the expander core (2) being retained with the outer cylinder (1) in a reversible manner.

Finally, the functionality of the activator screw (3) is as described below.

The external thread (31) of the activator screw (3) fits in the internal thread (22) of the expander core (2) for the coupling thereof, as discussed.

The function of the recess (32) is to act as a seat for the base of the head of a fixing screw (5) intended for screwing the interphase on the implant (6) so as to be fixed.

The surface with a hexagonal cross section (33) is configured for the tightening or loosening of the activator screw (3) in the expander core (2) by means of a tool with the same hexagonal geometry such that the fitting achieved is permanent or reversible.

Finally, the activator screw (3) has two functions. The first function is to provide a precise seat for the head of the fixing screw (5) as discussed. The second function is to be responsible for creating the mechanical retention of the interphase with the implant (6) in a definitive manner. This retention is produced when, with the expander core (2) and the outer cylinder (1) being in the assembly position, with the activator screw (3) being pre-assembled in the expander core (2), the activator screw (3) is tightened by incorporating the assembly tool on the surface with a hexagonal cross section (33). This tightening determines two types of retentions.

Figure 6:
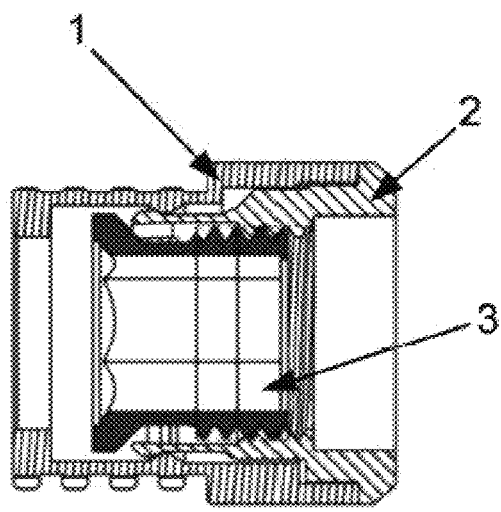
FIG. 6 depicts a cross-sectional view of the assembly of the interphase of the invention in a temporary fixing situation.

On one hand, as depicted in FIG. 6, if the depth of screwing of the activator screw (3) is such that the outermost area of the projecting head (34) does not contact the notches (23) of the expander core (2), temporary retention is achieved. This means that the retention allows the outer cylinder (1) to be taken off the expander core (2) by simply pulling it to get the protuberances (25) of the notches (23) to pass the projection (11) by elastic deformation.

Figure 7:
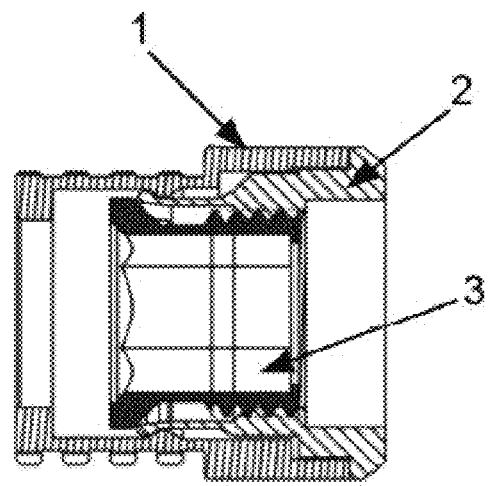
FIG. 7 depicts a cross-sectional view of the assembly of the interphase of the invention in a permanent fixing situation.
Figure 8:
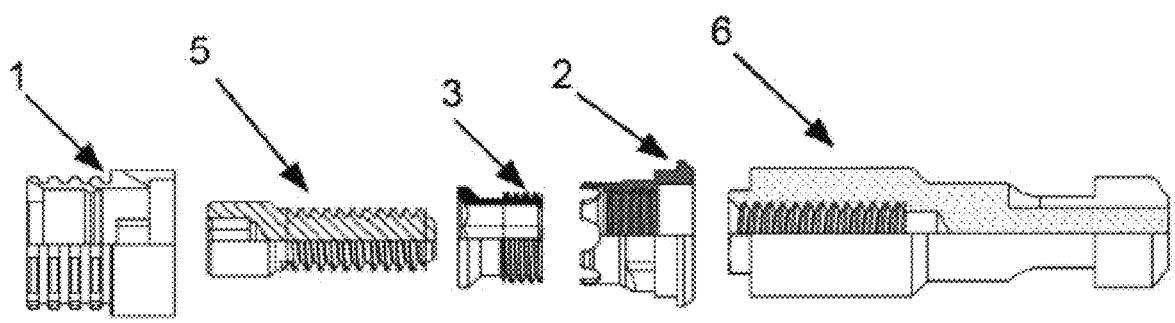
FIG. 8 depicts an exploded side view of the interphase together with the dental implant and the fixing screw in their relative positions prior to assembly.
Figure 9:
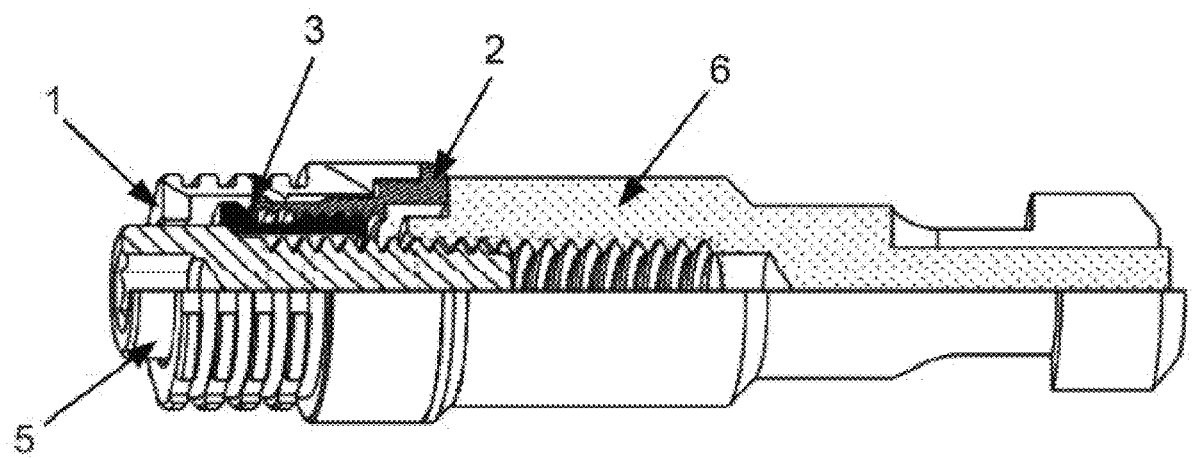
FIG. 9 depicts a sectioned perspective view of the interphase with the dental implant and the fixing screw in an already assembled situation.
Figure 10:
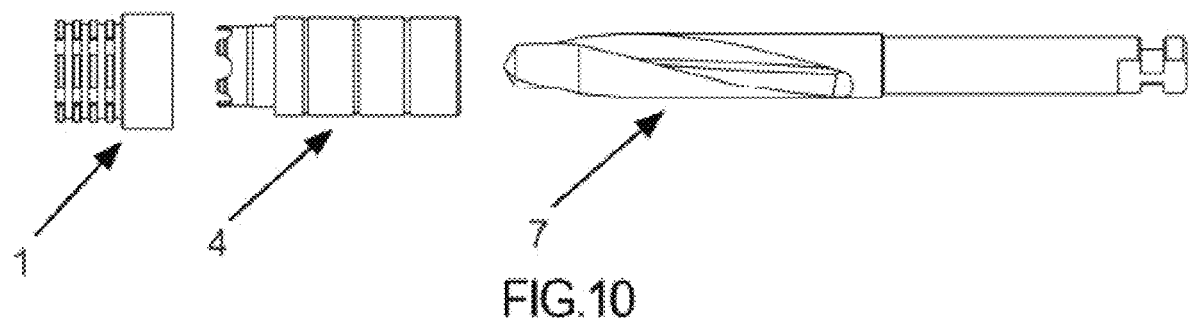
FIG. 10 depicts a side view of the guiding system for the manual drilling of a prosthetic structure not manufactured by CAD/CAM, showing the outer cylinder, the guide cylinder and a bit in their positions prior to assembly and contact.
Figure 11:
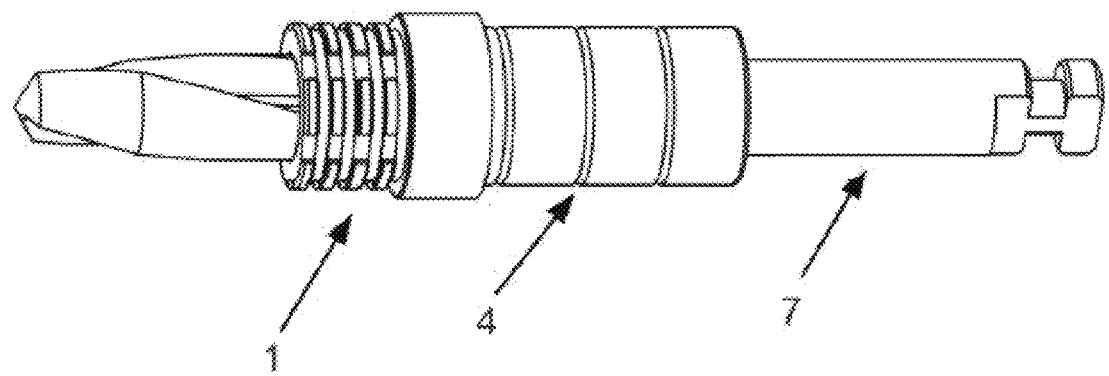
FIG. 11 depicts a perspective view of the guiding system for the manual drilling of a prosthetic structure not manufactured by CAD/CAM depicted in FIG. 10 in an already assembled situation.

On the other hand, if the activator screw (3) is screwed on as far as it can go, definitive retention is achieved. In this situation, as depicted in FIG. 7, the outermost area of the projecting head (34) of the activator screw (3) applies pressure on the notches (23), preventing them from being able to elastically deform and overcome the obstacle created by the projection (11) of the outer cylinder (1) for being able to take the expander core (2) off of the outer cylinder (1).

Therefore, the interphase can provide two different types of fitting, depending on the position of the activator screw (3): a permanent or definitive fitting, which is applied for normal working conditions in the mouth during the service life of the interphase, and a temporary fitting, for the purpose of being reversible, which is particularly applied during the period of handling the prosthesis.

The temporary fitting is used in prosthetic structures created by hand and, in the event of being manufactured by CAD/CAM, when the structure has to be introduced in a furnace for adding ceramic during the manufacturing process. In this situation, to leave the positions of the implants (6) defined with respect to the prosthetic structure, the prosthetic structure must first be fixed to the outer cylinders (1), and once the attachment has solidified, to remove it for making the channels housing the fixing screws (5) for the attachment to the implant (6). A guide cylinder (6) is used to do this.

Figure 4:
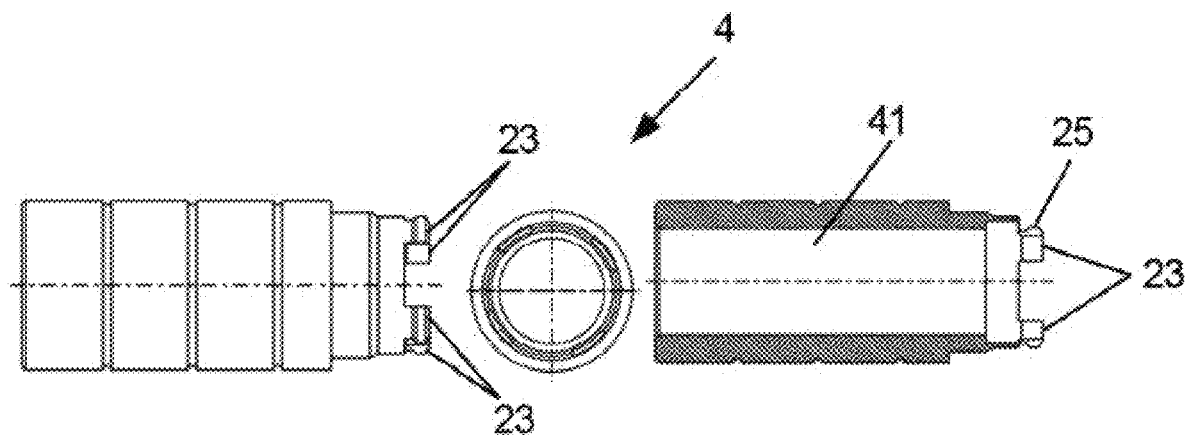
FIG. 4 depicts a side, front and cross-sectional view of the guide cylinder.
Figure 5:
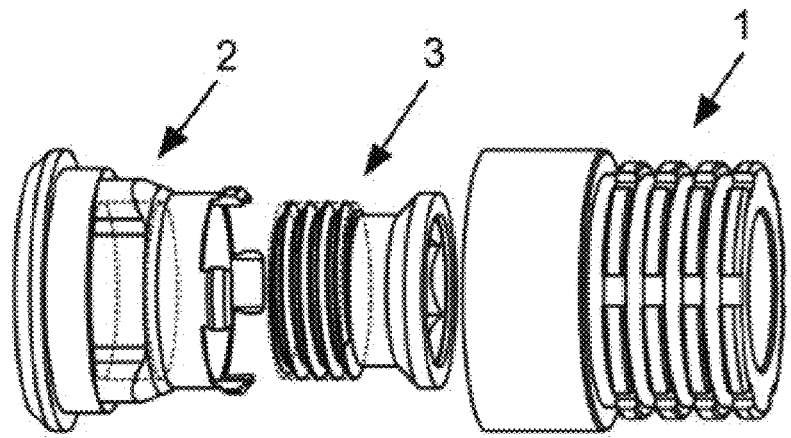
FIG. 5 depicts a perspective view of the interphase of the invention, formed by the outer cylinder, the expander core and the activator screw, in their relative positions prior to assembly.

The guide cylinder (6), as depicted in FIG. 4, is hollow and incorporates an inner cylindrical surface (41). At one of the ends it incorporates notches (23) with protuberances (25), completely identical to those of the expander core (2).

The guide cylinder (4) has the sole functionality of serving as a guiding cylinder for a bit (7) to drill and configure a channel in the prosthetic structure intended for housing the screw fastener (5) for fastening to the implant (6). To that end, the guide cylinder (6) is assembled on the outer cylinder (1) which is already inserted into the prosthetic structure and is accessible as it has separated been from the expander core (2) to which it was attached by a temporary connection through the protuberances (25) of the notches (23) and the projection (11) of the outer cylinder (1). Once the channel has been made in the prosthetic structure, the guide cylinder (4) is removed from the outer cylinder (1).

Therefore, as described, the method for carrying out the attachment of a prosthetic structure created by hand to an implant (6) has a process which could be described as follows:

a) coupling the activator screw (3) in the expander core (2) by lightly screwing without the projecting head (34) contacting the notches (23) and screwing the assembly to the implant (6) by means of the fixing screw (5).
b) coupling the outer cylinder (1) to the expander core (2);
c) coupling the prosthetic structure to the outer cylinder (1);
d) allowing to settle until achieving a definitive fixing of the prosthetic structure to the outer cylinder (1);
e) removing the prosthetic structure, incorporating the outer cylinder (1), from the expander core (2);
f) coupling a guide cylinder (4) in the outer cylinder (1) of the prosthetic structure;
g) inserting a router bit (7) into the guide cylinder (4) for machining a channel along the prosthetic structure;
h) removing the assembly formed by the expander core (2) and the activator screw (3) from the implant (6) and placing it on the outer cylinder (1) of the prosthetic structure;
i) positioning the prosthetic structure, together with the already assembled interphase, on the implant (6) by inserting a fixing screw (5) into the channel.

Furthermore, in the event that the prosthetic structure is multiple, i.e., it comprises a plurality of dental prostheses, it is fixed on a plurality of implants (6) which are already incorporated in the mandible or maxilla, therefore steps a)-d) are performed in each of the implants (6) for the prosthetic structure to be coupled to the plurality of outer cylinders (1) and to thus enable making the channels in each of the positions defined by the outer cylinders (1).

It must be taken into account that this method is used only for prosthetic structures created by hand, because if it is manufactured by CAD/CAM, the configuration imparted to it already incorporates not only the geometry of the connection element (26), but also the channel for inserting the fixing screw (5).

Finally, the present invention must not be considered as being limited to the embodiment herein described and other configurations can be made by those skilled in the art in view of the present description. Accordingly, the scope of the invention is defined by the following claims.

The invention claimed is:

1. A dental interphase, comprising:
a reversible adjustment mode that is capable of fitting a prosthetic structure to a dental implant;
an expander core, an activator screw and a connection element adapted to connect the activator screw to the expander core, wherein
the expander core comprises a base, a complementary coupling area, an internal thread and a plurality of notches, wherein each of the notches incorporates a protuberance,
the activator screw comprises an external thread, a projecting head, a recess in the internal area of the projecting head and a hollowing out formed for introducing a tool,
the connection element has a hollowed out cylindrical configuration externally having a smooth area and internally comprising a coupling area at one end and a projection within the connection element,
wherein:
the activator screw is configured be attached to the expander core by screwing the external thread onto the internal thread in the area of the notches to a specific depth,
the connection element is configured to be coupled to the expander core by attaching the coupling area in the complementary coupling area until the protuberances go past the projection,
such that, once the activator screw is inserted into the expander core:
the attachment of the interphase to the dental implant is permanent when the projecting head contacts the notches, and
the attachment of the interphase to the dental implant is reversible when the projecting head does not contact the notches, which is elastically deformed to overcome the projection; and
wherein the connection element is located in an outer cylinder incorporating a prolongation to externally incorporate a striated area configured to fix the prosthetic structure; and
wherein the outer cylinder is adapted to serve as a base for coupling a guide cylinder at one of the ends, incorporating a structure of notches identical to that of the expander core, for accurately positioning the channels according to the location of the dental implant.

2. The dental interphase according to claim 1, wherein the connection element is located in a prosthetic structure manufactured by CAD/CAM, such that the attachment of the prosthetic structure to the expander core is direct.

3. The dental interphase according to claim 1, wherein the dental interphase is configured to be attached to a prosthetic structure that includes a plurality of individual dental prostheses on a plurality of implants, wherein the prosthetic structure is manufactured by CAD/CAM.

4. The dental interphase according to claim, 1 wherein the prosthetic structure includes a plurality of individual dental prostheses on a plurality of dental implants, wherein said prosthetic structure is manufactured by hand.

5. The dental interphase according to claim 4, wherein once the prosthetic structure is positioned on the dental implants, the dental interphase is separable for making channels in the prosthetic structure, said channels being configured to house one or more fixing screws for fixing the prosthetic structure to the dental implants.

6. The dental interphase according to claim 5, wherein the guide cylinder incorporates a cylindrical hollowing out for guiding a router bit configured for machining the channels configured to house the fixing screws for fixing the prosthetic structure to the dental implants.

* * * * *